United States Patent [19]

Maples

[11] 4,253,687
[45] Mar. 3, 1981

[54] PIPE CONNECTION

[75] Inventor: John H. Maples, Houston, Tex.

[73] Assignee: Whiting Oilfield Rental, Inc., Houston, Tex.

[21] Appl. No.: 47,299

[22] Filed: Jun. 11, 1979

[51] Int. Cl.³ .......................................... F16L 15/00
[52] U.S. Cl. ................................ 285/332.3; 285/350; 285/355
[58] Field of Search ............... 285/334, 333, 355, 350, 285/332.2, 332.3, DIG. 19; 277/177, 168

[56] References Cited

U.S. PATENT DOCUMENTS

| 1,217,859 | 2/1917 | Drader et al. ............... 285/332.3 |
| 2,102,072 | 12/1937 | Hinderliter . |
| 2,107,716 | 2/1938 | Singleton . |
| 2,110,127 | 3/1938 | Hinderliter .................. 285/333 X |
| 2,110,825 | 3/1938 | Archer ........................ 285/334 X |
| 2,150,221 | 3/1939 | Hinderliter .................. 285/333 X |
| 2,259,232 | 10/1941 | Stone . |
| 2,553,340 | 5/1951 | Smith . |
| 2,770,477 | 11/1956 | Rankin . |
| 2,813,567 | 11/1957 | Williams . |
| 2,889,733 | 6/1959 | Vanderhoof . |
| 2,907,589 | 10/1959 | Knox ........................... 285/355 X |
| 2,980,451 | 4/1961 | Taylor et al. . |
| 2,992,019 | 7/1961 | MacArthur . |
| 3,054,628 | 9/1962 | Hardy et al. . |
| 3,100,656 | 8/1963 | MacArthur . |
| 3,160,427 | 12/1964 | Natho ......................... 285/332.3 X |
| 3,167,333 | 1/1965 | Hall et al. . |
| 3,336,054 | 8/1967 | Blount et al. . |
| 3,489,438 | 1/1970 | McClure ...................... 285/332.2 X |
| 3,667,784 | 6/1972 | Hokanson et al. . |
| 3,813,115 | 5/1974 | French ......................... 285/355 X |
| 4,026,583 | 5/1977 | Gottlieb ....................... 285/334 X |
| 4,085,951 | 4/1978 | Morris ......................... 285/355 X |

OTHER PUBLICATIONS

Hydril Tubular Connections, 1977 Edition.

Primary Examiner—Thomas F. Callaghan
Attorney, Agent, or Firm—Murray Robinson; Ned L. Conley; David A. Rose

[57] ABSTRACT

Pipe connection comprising "Hydril" type pin and box connectors with an annular groove formed in the pin connector at the juncture of the inner cylindrical land and the inner tapered seating surface and a seal ring of preferably circular cross section, e.g. an O-ring, disposed in the groove sealing between the pin connector and the box connector.

2 Claims, 8 Drawing Figures

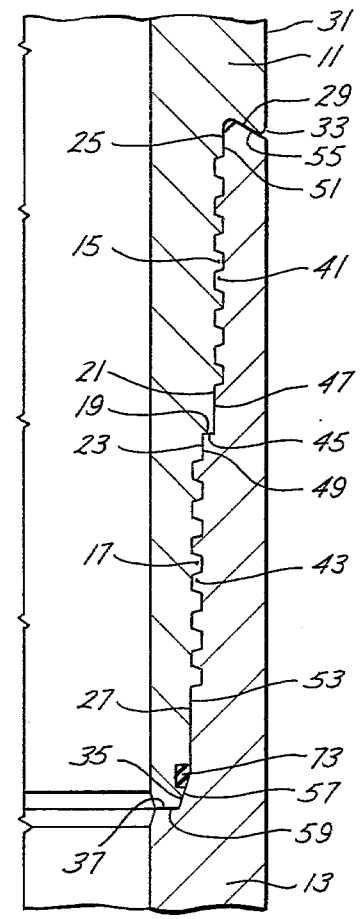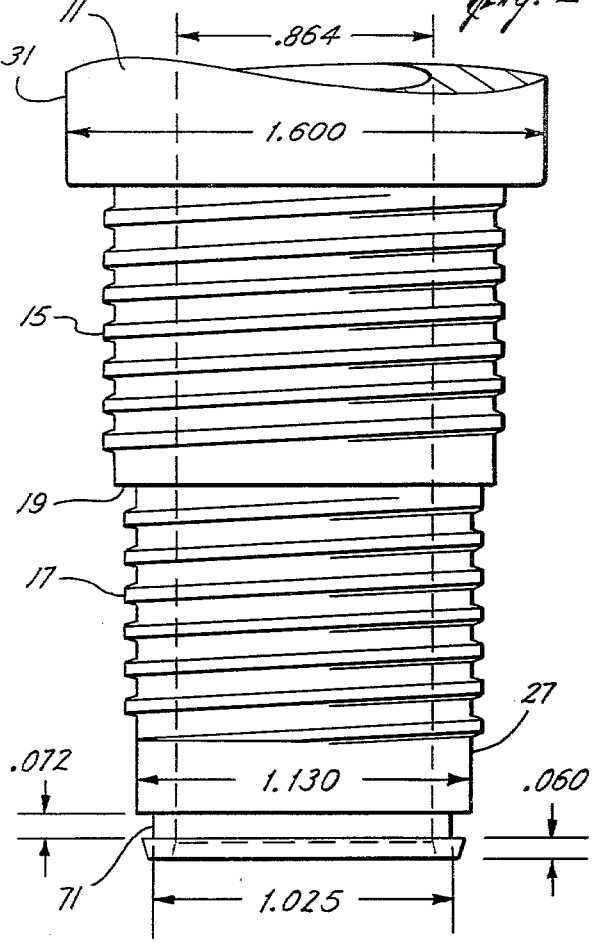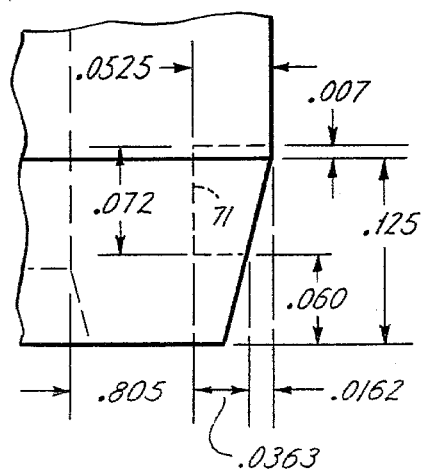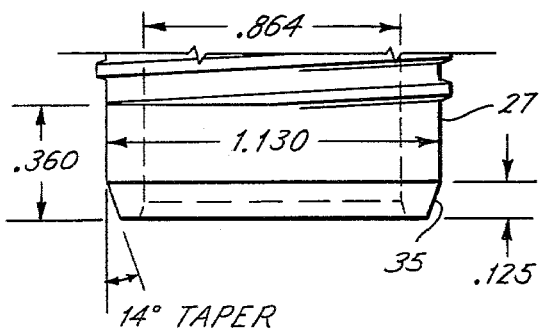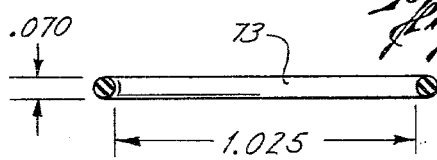

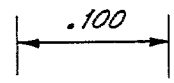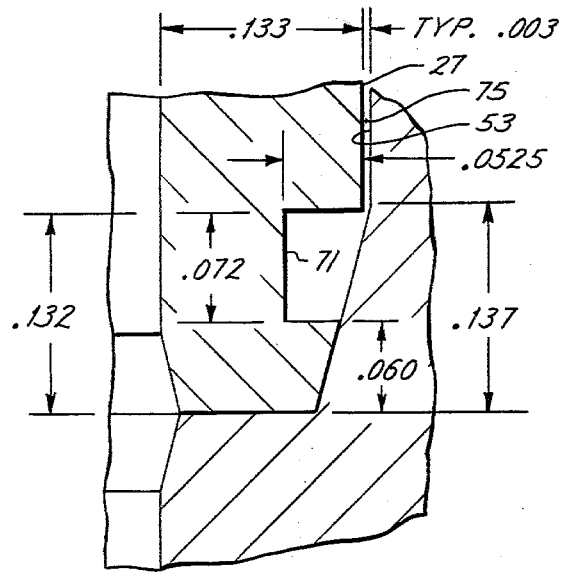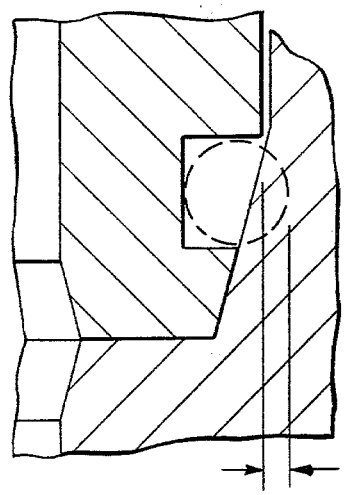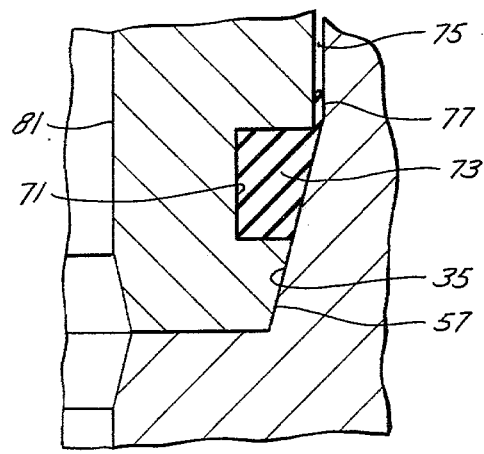

PIPE CONNECTION

BACKGROUND OF THE INVENTION:

This invention relates to pressure tight pipe connections and more particularly to a stepped, straight, buttress threaded connection, with internal and external tapered metal-to-metal seals, and perpendicular, positive, stop shoulders, and cylindrical alignment lands adjacent the seals, such connections being known to the trade as HYDRIL tubular connections. Such connections are described in some detail in the Hydril catalogue, 1977 edition, the disclosure of which is incorporated herein by reference and a copy hereunto annexed.

Such connections are used for connecting lengths of production tubing used in wells, e.g. oil and gas wells. The connections may be made up once and not thereafter broken. This is a different use from connections used for drill pipe and work-over drill strings where the connections are repeatedly made up and broken out as the pipe is run in and out of the hole.

For drill pipe, where there is sufficient room for thick walled connections, rugged tool joint type connections are employed. Tool joint connections employ heavy preload to insure sealing of the large area metal-to-metal seals. The presence of drilling fluid inside and outside the drill pipe limits the pressure differential to be withstood by the connections to approximately the pump pressure.

In the case of work-over drill strings, the sealing problem is more difficult than with drill pipe. Not only are the connections repeatedly made and broken but the work-over string is run inside existing production tubing without killing the well and hence without the benefit of drilling fluid to balance the formation pressure. The fluid inside the production tubing outside the work-over pipe may be at very high pressure, e.g. 10,000 psi or more. In addition, the fluid being produced by the well may contain salt water or other corrosive material.

Furthermore, the consequences of a leak in a work-over string are much more serious than with drill pipe. If there is a leak in a work-over drill string, it may be necessary to kill the well in order to make possible the safe removal of the drill string. Killing a well by pumping in mud or other heavy material to shut off and balance the formation pressure may permanently damage the well, and in any event will probably necessitate additional operations such as swabbing and perhaps fracturing to restart a proper flow. In the case of drill pipe, on the other hand, the well has not yet been brought in, it is already under the control of drilling mud.

For work-over drill strings, it is usual to use type "CS" (trademark) Hydril connections, as shown on page 10 of the Hydril 1977 catalogue. Such connections have a bore shoulder providing the final positive stop. It is suggested in the Hydril catalogue, at page 10, that "The reserve torque strength in Hydril "CS" tubing connections has actually permitted operators to use their strong "NS-80" Hydril "CS" tubing strings as drill out strings—making round trips as needed, drilling and working as needed and then setting the same string as production tubing."

As above suggested, a work-over operation is usually a drill out procedure. Something is wrong with an existing well; it is not flowing at the expected rate. A slender work-over string, e.g. one inch inner diameter or one and five-sixteenths inch outer diameter, is snubbed in through the production tubing, and the bottom of the well is drilled out to remove, for example, an accumulation of shale. Or the bottom of the well may be washed out.

The work-over string is run in through a small blow out preventer which closes the annulus between drill string and production tubing. A suitable check valve at the bottom of the string prevents flow up the work-over string. If a leak develops in the work-over string, it is difficult to remove the work-over string without killing the well, since the work-over string fills up with high pressure fluid and it is not safe to break the connections in the string as required for its removal.

The metal-to-metal seals of Hydril connections may not be expected to maintain their pressure tightness after repeated make up and break out, and in many cases today are not even initially rated as high as the pressures that may encountered in the course of working over an existing well. To insure against leakage it is customary to supplement the metal-to-metal seals with an O ring seal. Such seals have been placed in the box. However, the installation of the seals and the cleaning of the grooves on such small diameter parts is difficult.

EVOLUTION OF THE INVENTION:

The operation of O ring seals is described in an article entitled

"Back-up ring eliminates high pressure O-ring leaks" appearing in the magazine World Oil for July 1978 at pages 109, 110 and 112.

Stepped threaded connections for pipes are shown in U.S. Pat. Nos.:
 2,259,232—Stone
 2,992,019—MacArthur.

U.S. Pat. Nos.:
 2,102,072—Hinderliter
 2,107,716—Singleton
 2,110,825—Archer
 2,907,589—Knox
 3,100,656—MacArthur
 3,336,054—Blount et al
 3,667,784—Hokanson et al show the use of sealing rings in a groove in the box of a threaded connection.

U.S. Pat. No. 2,474,566—Stone shows the use of a seal ring in a groove in the tapered threaded portion of the pin part of a connection. The seal ring engages a threaded portion of the box.

U.S. Pat. No. 3,822,902—Maurer et al shows a threaded connection including an O ring in a groove around the large diameter end of a taper threaded pin.

U.S. Pat. Nos.
 2,110,127—Hinderliter
 2,150,221—Hinderliter (FIG. 4)

show rubber sealing rings positioned at various places in threaded connections, including a groove around the small diameter end of a tapered threaded pin.

In the 221 patent it is said that a seal ring of square or polygonal cross-section is employed. Furthermore, it appears that the tapered areas of the pin at each side of the seal ring groove are out of contact with the tapered area of the box. In other words, there is no metal-to-metal seal, just a rubber to metal seal, and FIG. 4 shows the rubber extruded into the crack between the opposing but not contacting tapered areas of the pin and box.

In the '127 patent, at lines 40–50, it is stated:

"In FIGS. 3 and 4 is illustrated a modification in which the male member 115 which may correspond to either the upset end of a pipe or the threaded shank of a pin member is screwed into a tapered socket 119 in a tool joint member 110. The lower end of the tapered socket 113 is not threaded but instead is provided with a tapered or inclined smooth wall 116 adapted to wedgingly cooperate with a rubber sealing ring 117 disposed in an annular groove 118 in the lower end of the male member 115."

and at lines 55–66 it is said that

"By reason of the fact that the socket 113 is tapered, the rubber ring 117 is enabled to clear the threads until it reaches the bottom of the socket. When the ring comes into engagement with the inclined wall 116, the inserting thrust of the male member will cause it to be wedged into tight sealing engagement with the inclined or tapered wall 116 as shown in FIG. 4."

However, it is not stated that there is any metal-to-metal seal adjacent to the rubber to metal seal, and the rubber ring does not appear to have a circular cross-section. In this regard one may note that FIG. 3 shows the parts just prior to seating, in other words with the seal ring uncompressed, and that FIG. 3 shows a seal ring of rectangular cross-section. Note also the metal-to-metal clearance in FIG. 4 where the seal is shown fully seated. Further in regard to the shape of the seal ring note the further description of the FIGS. 7 and 8 embodiments of the '127 patent as follows:

"The modification of the invention illustrated in FIGS. 7 and 8 is similar to that shown in FIGS. 3 and 4 with the exception that in this form of the invention the outer periphery of the rubber sealing ring 217 is inclined or tapered and the wall 216 is substantially straight.

The rubber sealing ring 217 is seated in a groove 218 in the lower end of the tapered threaded male member 215 screwed into the tapered threaded socket 213 of the tool joint member 210.

The outer periphery of this rubber ring 217 is inclined upwardly and outwardly from the lower end of the shank 215 as indicated at 220. The bottom of the socket 213 terminates in a substantially straight wall 216 adapted to wedgingly cooperate with the sealing ring 217.

In FIG. 7 I have illustrated the condition of the rubber sealing ring 217 prior to its being wedged or crowded down the wall 216, whereas in FIG. 8 I have illustrated its position after it is wedged into contact with the wall 216 by the inserting thrust of the male member 215."

In U.S. Pat. Nos.
4,009,893—Schatton et al (FIG. 2)
4,085,951—Morris
there are disclosed stepped threaded connections with seal means at the intermediate shoulder. In the '951 patent, the most recent of this group, issued in 1978, it is stated:

"In oil fields, drill strings are frequently connected by Hydril-type connectors, which involve a two step thread design, as is well known to those in the art. For instance, Hydril-type connectors are disclosed in U.S. Pat. No. 2,532,632, the disclosure of which is hereby incorporated by reference for the teachings of the Hydril-type connectors therein.

The prior art has made extensive use of "O" rings and similar sealing means, in the sealing of pipes and the like. See, for instance, U.S. Pat. Nos. 3,054,628; 3,167,333; 2,980,451; 2,889,733; 2,813,567; 2,770,477; and 2,553,340. Generally the sealing rings or gaskets of these prior art patents have been made of Teflon or similar plastic material.

The use of rings of plastic or rubber, or the like, in rotary tools is also known to the art, see, for instance, U.S. Pat. Nos. 2,102,072 and 2,110,127. Finally, the use of Teflon as a sealing ring in Hydril-type connectors is disclosed in U.S. Pat. Nos. 2,907,589 and 3,100,656. In these patents, the Teflon seal ring is located in the area of the free terminal forward end of the pin member of the Hydril-type connector. If such sealing rings are located on the pin member, they are highly susceptible to damage, and if located on the box member they are quite difficult to install, and subject to a tendency to be locally deranged in an unpredictable manner as the joint is made up.

* * * * *

As acknowledged hereinabove, many different designs of screw threaded pin and box type tubing and drill pipe joints have been proposed by the prior art. However, in spite of the many proposals, a number of problems have remained unsolved, especially those problems having to do with a method of adequately and enduringly sealing a Hydril-type connector after the metal-to-metal seating surfaces have been damaged, which is a frequent occurence, against the extremely high fluid pressures which are encountered in deep drilled oil and gas wells. For instance, such pressures might range as high as 15,000 psi.

The rubber O-rings and compressible rubber gaskets, such as those acknowledged hereinabove, have from time to time been used to seal pipe and tubing joints, and under certain operating conditions, especially when relatively low pressures are involved, they have proven to be thoroughly satisfactory. However, such seals have not been suitable for use under the high temperature and pressure conditions which are encountered in deep oil and gas wells. For one thing, these relatively thin rubber rings tend to be badly damaged, and often rendered useless, by being extruded under the well pressure into small clearances between the joint members at the seal ring groove."

The patent then goes on to describe a construction employing a relatively rigid sealing ring such as one made of Teflon or hard rubber and claims such a rings as being made of "relatively rigid, internally tenacious plastic or rubber material," and states that such rings is to be placed at the area between the different diameter threaded areas, i.e. at the intermediate land.

It is apparent from the foregoing that despite much effort, the problem of providing a satisfactory seal for a Hydril-type connection in a work-over string remains.

SUMMARY OF THE INVENTION:

According to the invention a Hydril-type tubing connector is adapted for use in a high pressure work-over string by providing a groove in the pin at the juncture of the tapered sealing surface at the tip, i.e. small diameter end, of the pin, and the adjacent cylindrical land, and placing in the groove an elastically deformable plastics material seal ring, preferably of circular cross-section for ease of assembly, e.g. an O-ring, the ring protruding from the groove but not far enough to interfere too much with the box threads during stabbing and there being sufficient space in the groove to accommodate most of the O-ring when deformed under pressure and the clearance between the cylindrical lands on the pin and box accommodating any excess, so that the supportive back up provided by metal-to-metal engagement and possible seal adjacent to the O-ring and nearer to the tip of the pin is not inhibited. If the seal between the mouth of the Hydril box and the root of the pin sould fail to function, either initially or at any time after make up, high pressure fluid outside the connection will tend to flow between the pin and box along the threaded areas but will meet the O-ring seal. The O-ring wll be urged to move toward the tip of the pin but will not extrude past the tapered metal-to-metal seal area which makes a close fit. Even if the metal-to-metal seal is ineffective at the tip in the pin, e.g. due to the pin being crimped inwardly due to excessive makeup or drilling torque, the fit will be close enough to prevent substantial extrusion of the O-ring, and as a result the O-ring will hold the pressure.

In the case of high pressure fluid within the drill string, the metal-to-metal seal at the tip of the pin will be enhanced by the increased flexibility of the pin tip due to the groove therein. The O-ring will to some extent be supported against fluid pressure applied from inside the pipe. Should the metal-to-metal seal at the tip fail due to the fairly close fit therebetween, the O-ring will to some extent be inhibited from extrusion between the cylindrical lands on the pin and box adjacent to the metal-to-metal tapered seal.

BRIEF DESCRIPTION OF THE DRAWINGS:

For a more detailed description of preferred embodiments of the invention, reference will now be made to the accompanying drawings wherein:

FIG. 1 is an enlarged fragmentary axial section through a tubing connection embodying the invention;

FIG. 2 is a fragmentary elevation, full scale, showing the pin portion of the connection, with the O-ring omitted, and showing the dimensions of the parts;

FIG. 3 is a view similar to FIG. 2 showing the pin prior to cutting the O-ring groove;

FIG. 4 is a section showing the O-ring seal and its relaxed dimensions.

FIG. 5 is a schematic view, similar to FIG. 2 but to a larger scale, showing in solid lines the nose seal portion of the connection before the seal ring groove has been cut, dotted lines showing the seal groove to be cut;

FIG. 6 is a fragmentary sectional view to the same scale as FIG. 5 showing both the pin and box portions of the connector at the pin tip, but with the O-ring omitted;

FIG. 7 is a schematic view similar to FIG. 6 showing in dotted lines the O-ring in the relaxed condition prior to compression by the box; and FIG. 8 is a view similar to FIG. 6 showing the O-ring in compressed condition as it is when the connection is made up.

DESCRIPTION OF PREFERRED EMBODIMENT:

Referring now to FIG. 1, there is shown a pipe connection comprising a pin connector 11 and a box connector 13, each of which may be formed integrally on the end of a length of pipe or may be separately formed and then connected to the pipe. The pin is provided with an outer thread 15 and an inner thread 17, the threads both being straight modified Acme or buttress threads but the cylindrical base of thread 15 being larger than that of thread 17. A step 19 between the threads lies in a plane perpendicular to the pin axis. Cylindrical lands 21, 23 lie between the step and the threads at either side of the step. Cylindrical lands 25, 27 lie at the ends of the threads, land 25 being colevel with the crest of thread 15, and land 27 being colevel with the base of thread 17. A downwardly flaring conical seal shoulder 29 joins outer land 25 with the outer periphery 31 of the pin connector via a bevel 33. The lower or tip end of the pin connector has a conically tapered seal surface 35 which joins the flat end 37 of the pin connector.

Box connector 13 is provided with two threads 41, 43, step 45, cylindrical lands 47, 49 adjacent thereto and outer and inner cylindriacl lands 51, 53, correlative to the adjacent parts of the pin connector. A bevel 55 forms the mouth of the box connector and is adapted to seal with shoulder 29 when the connectors are screwed together, forming an outer seal. A conically tapered seat 57 in the bottom of the box connector is adapted to engage with the tapered seal surface 35 of the connector pin and may seal therewith, when the connectors are screwed together, to form an inner metal-to-metal seal. A flat shoulder 59 is disposed opposite to flat end 37 of the pin connector, at which time steps 19, 45 will also be close together, actual engagement of the steps and/or the flat bottom of the box connector and flat end of the pin connector positively limiting make-up of the connectors.

The foregoing describes what is known to the trade as a "Hydril" connection. According to the present invention an annular groove 71 (FIG. 2) is cut in the connector pin at the juncture of cylindrical land 27 (FIG. 3) and conical tapered seating and seal surface 35, an O-ring 73 (FIG. 4) is placed in this groove, being stretched over the end of the pin connector and allowed to snap into the groove wherein as shown in FIG. 7 it fits snugly about the bottom of the groove with nominally substantially zero clearance or with a slight interference of a few thousandths of an inch measured radially. When the pin connector thus modified and provided with a slightly protuberant O-ring (FIG. 7) is screwed together with a box connector, the O-ring is deformed and fills the groove, as shown in FIG. 1. As shown in FIG. 6, there is a slight clearance 75 between cylindrical lands 27, 53, and the volume of O-ring 73 in excess of the volume of groove 71 will flow into such clearance, as shown in FIG. 8 at 77.

The volumes of O-ring 73 and groove 71 are proportional to their cross sections. From the dimensions given by the drawings, which are typical for connectors for nominal one inch diameter tubing, it will be seen that the cross-sectional area of the O-ring is 0.00385 sq. in. whereas the cross-sectional area of groove 71 (cross-hatched in FIG. 5) is only 0.00326 sq. in. or 83.7% of that of the O-ring, so that clearance 75 must accommodate 16.3% of the O-ring volume when the connection is made up fully, as shown in FIG. 8.

When the connection is in use, if the outer seal at 29–55 fails to hold the external high pressure, high pressure fluid will leak in and flow between the connector pin and box past the threads and step into clearance 75 where it will be stopped by O-ring 73. The O-ring will not be extruded out between the lower end of the pin connector and the bottom of the box in the box connector because conically tapered seating surfaces 35-37 are in full engagement and will prevent such extrusion.

Should high pressure be applied to the inside of the connection, seating surface 35 will flex outwardly into sealing engagement with seating surface 57, forming a metal-to-metal seal. This lip seal type flexing will be assisted by virtue of the back up provided by the initial sealing of O-ring 73 against such pressure. In other words, the O-ring will provide an initial pressure drop creating a pressure differential between the inner surface 81 (FIG. 8) of the lower end of the pin connector and outer surfaces of the lower end of the pin connector downstream from seating surfaces 35-37. Such pressure differential will expand the lower end of the connector pin and seating surface 35 into sealing engagement with sealing surface 57. Thereafter, the pressure drop across the metal-to-metal seal at 35-37 will create a further pressure differential between inner surface 81 and all of the outer surface of the lower end of the connector pin, causing the seating surfaces 35-37 to be pressed into tighter metal-to-metal sealing engagement. The presence of groove 71 facilitates outward movement of seating surface 35 under these circumstances.

Preferably O-ring 73 is made of "Teflon" (poly-tetra fluor ethylene) or of an elastomer such as "Viton" rubber having a durometer hardness in excess of 70, preferably about 90, on the Shore A scale; a hardness of as much as 110 on the composite A-D scale (60 on the Shore D scale) being considered probably suitable, or of other high temperature resistant, petroleum and salt water resistant, elastically deformable or flowable, plastics material.

The circular cross section of the O-ring prevents it from becoming inoperably twisted during placement in the groove and allows it to protrude slightly beyond the crest of the box threads without being ripped out of its groove during insertion of the pin in the box, the O-ring curvature guiding the ring and causing it to deform as needed to pass through the box thread.

While a preferred embodiment of the invention has been shown and described, modifications thereof can be made by one skilled in the art without departing from the spirit of the invention. For example other dimensions, suitably scaled up or down, would be applicable to other sizes of connectors, and the invention is applicable to a variety of forms of Hydril and other types of connections.

The present invention is the result of a long period of experimentation and field testing with rental pipe which began over a year ago and resulted in the groove dimensions and O-ring location set forth herein which were decided upon only in the Spring of 1979.

I claim:

1. Pipe connection comprising
a tubular pin having on its exterior progressing from its distal end to its proximal end an external tapered seating surface adjacent said distal end, an annular groove adjacent said tapered external seating surface, a cylindrical external land adjacent to said external tapered seating surface, a first straight external thread adjacent to said cylindrical external land, a second straight external thread of larger diameter than said first straight external thread adjacent said first straight external thread, and a stop shoulder beyond said second external straight thread,
a tubular box having on its interior progressing from its bottom to its mouth a tapered internal seating surface adjacent the bottom of the box, a cylindrical internal land adjacent to said tapered internal seating surface, a first straight internal thread adjacent to said cylindrical internal land, a second straight internal thread of larger diameter than said first straight internal thread adjacent said first straight internal thread, and an annular stop surface beyond said second straight external thread,
the aforementioned parts of said pin being correlative to those of the box whereby the pin and box can be screwed together with said tapered sealing surfaces in engagement and said cylindrical lands opposite each other, and
a seal-ring disposed in said groove sealing between said pin and said internal tapered seating surface of said box when said pin and box are made up together, said seal ring lying between the area of metal to metal engagement of said seating surfaces and the area of proximity of said cylindrical lands,
said groove having a maximum depth less than the unstressed thickness of the seal ring, the cross-sectional area of the groove being less than the cross-sectional area of the seal ring, and when the connection is fully made up there being clearance between said cylindrical lands, said seal ring entirely filling the groove and extruding from the volume between said groove and said internal tapered seating surface into said clearance between said cylindrical lands adjacent thereto.

2. Pipe connection according to claim 1
said groove having a cylindrical bottom coaxial with the pin and side walls perpendicular to the axis of the pin, the radial depths of the groove being at leats fifty per cent of the wall thickness of the pin between the bottom of said groove and the inner periphery of the tubular pin, said seal ring being an O ring and the width of the groove exceeding the wire diameter of the groove only slightly and enough to allow easy insertion of the O ring, the outer toroidal diameter of the O ring exceeding the inner diameter of the box's first said straight thread but insufficiently to prevent assembly of the pin in the box, said O ring compressing radially toward the pin axis into said groove as the O ring moves inside said internal cylindrical land and then flowing to occupy the entirety of the space between said groove and said internal tapered seating surface and to extrude between said cylindrical lands adjacent to said groove and said internal tapered seating surface.

* * * * *

UNITED STATES PATENT AND TRADEMARK OFFICE
CERTIFICATE OF CORRECTION

PATENT NO. : 4,253,687

DATED : March 3, 1981

INVENTOR(S) : JOHN H. MAPLES

It is certified that error appears in the above—identified patent and that said Letters Patent is hereby corrected as shown below:

Column 1, line 54, change "Hydrill" to --Hydril--.

Column 2, line 18, after "that may" insert --be--.

Column 2, line 20, change "O ring" to --O-ring--.
Column 2, line 27, change "O ring" to --O-ring--.

Column 2, line 51, change "O ring" to --O-ring--.
Column 2, line 53, after "Pat. Nos." insert a colon (:).
Column 2, line 59, change "221" to --'221--.
Column 4, line 5, after "Generally" insert a comma (,).
Column 4, line 52, change "rings" to --ring--.
Column 4, line 54, change "rings" to --ring--.
Column 5, line 10, before "If the seal between" start a new paragraph.
Column 6, line 19, change "cylindriacl" to --cylindrical--.
Column 7, line 44, after "For example" insert a comma (,).
Column 8, line 27, change "metal to metal" to --metal-to-metal--.
Column 8, line 42, change "depths" to --depth--.
Column 8, line 43, change "leats" to --least--.

UNITED STATES PATENT AND TRADEMARK OFFICE
CERTIFICATE OF CORRECTION

PATENT NO. : 4,253,687
DATED : March 3, 1981
INVENTOR(S) : JOHN H. MAPLES

It is certified that error appears in the above—identified patent and that said Letters Patent is hereby corrected as shown below:

Column 8, line 46, change "O ring" to --O-ring--.
Column 8, line 48, change "O ring" to --O-ring--.
Column 8, line 49, change "O ring" to --O-ring--.
Column 8, line 52, change "O ring" to --O-ring--.
Column 8, line 53, change "O ring" to --O-ring--.

Signed and Sealed this

Fifteenth Day of December 1981

[SEAL]

Attest:

GERALD J. MOSSINGHOFF

Attesting Officer  Commissioner of Patents and Trademarks